United States Patent [19]

Streck et al.

[11] 4,183,844
[45] Jan. 15, 1980

[54] POLYMERIC ADHESION PROMOTERS FOR VULCANIZABLE MIXTURES OF ELASTOMERS AND MINERAL FILLERS

[75] Inventors: Roland Streck, Marl; Dieter Zerpner, Oer-Erkenschwick; Horst Haag; Karl-Heinz Nordsiek, both of Marl, all of Fed. Rep. of Germany

[73] Assignee: Chemische Werke Huls Aktiengesellschaft, Marl, Fed. Rep. of Germany

[21] Appl. No.: 819,192

[22] Filed: Jul. 26, 1977

[30] Foreign Application Priority Data

Aug. 7, 1976 [DE] Fed. Rep. of Germany ....... 2635601

[51] Int. Cl.$^2$ ............................ C07F 7/18; C07F 7/08
[52] U.S. Cl. ........................... 260/42.15; 260/448.8 R; 260/448.2 R; 260/448.2 H; 106/308
[58] Field of Search ................. 260/448.8 R, 448.2 H, 260/42.15, 448.2 R; 106/308

[56] References Cited

U.S. PATENT DOCUMENTS 4,105,567  8/1978  Koerner et al. .......... 260/448.8 R X

*Primary Examiner*—Paul F. Shaver
*Attorney, Agent, or Firm*—Millen & White

[57] ABSTRACT

Polybutadiene oils of 400–6,000 molecular weight, having double bonds which are 10 to 60% vinyl, 1 to 15% transvinylene and 25 to 85% cis-vinylene, and 3–20% by weight, corresponding to 0.4 to 3% by weight of bound silicon, of which are reactive silyl polymer units of the formula

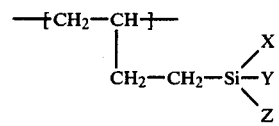

wherein X is a hydrolyzable group and Y and Z are the same as X or are H and/or alkyl of 1–8 carbon atoms, cycloalkyl of 5–12 carbon atoms, or optionally substituted phenyl; are useful as adhesion promoters for vulcanizable elastomer compositions comprising a mineral filler.

8 Claims, No Drawings

POLYMERIC ADHESION PROMOTERS FOR VULCANIZABLE MIXTURES OF ELASTOMERS AND MINERAL FILLERS

BACKGROUND OF THE INVENTION

The invention relates to novel adhesion promoters which are highly active in mixtures of elastomers and mineral fillers and are adapted for crosslinking by sulfur or peroxide. The novel adhesion promoters consist of hydrosilylated polybutadiene oils of a specific microstructure.

Carbon blacks of various specifications are used as one component of elastomer mixtures. Addition of carbon black is done less for rendering the vulcanizates produced from this mixture more economical than for improving the characteristics of the vulcanizates, especially tear strength, modulus, hardness, tear propagation resistance and abrasion resistance. Therefore, carbon black is considered an "active" or "reinforcing" filler.

For various reasons, the utilization of carbon black in elastomer mixtures is limited. Mixtures prepared therewith are necessarily black, rather than colored or white. Good quality carbon blacks have become so expensive that it has become increasingly desirable to replace the carbon blacks by inexpensive mineral fillers, such as silicic acid, kaolin, aluminum hydroxide and glass.

Such substitution also reduces the proportion of components derived from crude oil, which raises critical questions as to availability. Utilization of highly active silicic acids is advantageous for optimizing certain properties, e.g., notch impact strength.

Light-colored mineral fillers have been used heretofore, primarily for purely economical reasons. However, considerable losses of properties required for practical applications for example, heat buildup, elasticity and compression set, had to be tolerated.

These disadvantages can be at least partially eliminated by the use of so-called adhesion promoters, which are substances having a certain affinity to the filler and to the elastomer. This affinity is preferably manifested by chemical reactivity toward both substrates.

Organofunctional silanes are known as tackifiers. These compounds are of the formula R—SiX$_3$, wherein X in most cases is alkoxy, or less commonly halogen, and R is alkyl or aryl substituted by a functional group. Examples of such abrasion promoters derived from organofunctional, low-molecular silanes used in elastomer technology with particular frequency and which are offered commercially by several manufacturers are vinyl tris(methoxyethoxy)silane and γ-mercaptopropyltriethoxysilane. Although these products yield satisfactory results with respect to the properties of elastomer-filler combinations produced therewith, each has several disadvantages in use.

Each is usable with optimal results only for a specific type of crosslinking technique. The mercaptosilane and related compounds, e.g., the polysulfide derivable therefrom, of U.S. Pat. Nos. 3,873,489, 3,842,111 and 3,978,103, is suitable only for conventional sulfur vulcanization, whereas the vinylsilane is suitable only for peroxide vulcanization. The mercaptosilane has an unpleasant odor and a tendency toward premature vulcanization or scorch of mixtures containing this compound. These organofunctional silanes are extraordinarily expensive compared to other components of the elastomer mixture and have toxicity upon inhalation and skin contact. This toxicity cannot be ignored.

Numerous attempts have been made to synthesize similarly effective polymeric adhesion promoters. Natural rubber and SBR can be hydrosilylated by heating with trichlorosilane to about 300° C. (U.S. Pat. No. 2,475,122). The resulting reaction products adhere well to sheet glass (U.S. Pat. No. 2,557,778).

Photochemical hydrosilylation of a liquid polybutadiene obtained by anionic polymerization is described in U.S. Pat. No. 2,952,576, which is directed to glass fibers, coated with this material, for the reinforcement of unsaturated polyester resins. Although the microstructure of the liquid polybutadiene employed is not disclosed, the compound is produced using a sodium suspension and is thought, from comparison with literature data, to contain about 60-70% vinyl, 30-20% trans-vinylene, and about 10% cis-vinylene.

Hydrosilylation of polybutadienes by platinum containing-catalysts is described in U.S. Pat. No. 3,470,226 and DT-OS No. 1,720,527. The materials are intermediates in the manufacture of foam stabilizers and/or laminating resins. These references do not suggest using the reaction products in vulcanizable elastomer-filler mixtures. Furthermore, both products have a high vinyl content whereas the residual double bonds are predominantly of trans-vinylene. Polybutadienes of this microstructure, even at relatively low molecular weights, have very high viscosity at room temperature. Handling, dosing, and mixing is therefore extraordinarily difficult. The same limitations apply to the hydrosilylated derivatives.

Conventional Pt catalysis for hydrosilylation is also utilized in U.S. Pat. No. 3,759,869, directed to polymers having molecular weights between 500 and 50,000, which contain at least 25% of the structure

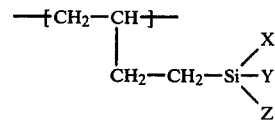

This corresponds, using pure polybutadiene as the basic polymer, to the attachment of a reactive silyl group —SiX$_3$ to approximately each tenth monomer unit. The examples disclose hydrosilylation of a polybutadiene having an average molecular weight of 1,000 and a vinyl content of 90%, based on total double bonds, with practically 100% saturation of all vinyl groups present. Mixtures of such products and/or of their derivatives, obtained by secondary reactions, with low-molecular polypropylene (molecular weight 5,000) and/or EPM rubber are merely mentioned without any statements regarding their effectiveness. Additionally, such essentially saturated polybutadiene derivatives and/or fillers provided therewith are scarcely suitable, based on the lack of double bonds, for linkage with a polymer network formed by sulfur or peroxide vulcanization.

U.S. Pat. No. 3,881,536 claims hydrosilylation of elastomeric polymers containing at least preferably 5-30% by weight of vinyl groups, and the use thereof as coupling agents for the vulcanization of a vulcanizable elastomer containing a silicic-acid-containing pigment. These products can, owing to high molecular weight, be used only in solution.

Other references on hydrosilylated hydrocarbon polymers include Streck et al, U.S. Pat. Nos. 3,920,714, 3,920,715 and 3,929,850, the disclosures of which are herein incorporated by reference.

It is therefore an object of the present invention to provide an adhesion promoter effective in elastomer-filler mixtures crosslinked by a peroxide or by sulfur, which does not exhibit the disadvantages of the above products.

SUMMARY OF THE INVENTION

In a composition aspect, this invention relates to polybutadiene oils of molecular weight 400-6,000, having double-bonds which are 10 to 60% vinyl, 1 to 15% transvinylene, and 25 to 85% cis-vinylene, and 3-20% by weight, corresponding to 0.4 to 3% by weight of bound silicon, of which are reactive silyl polymers units of the formula

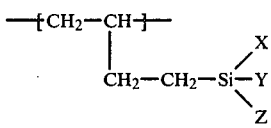

wherein X is halogen or alkoxy of up to 8 carbon atoms and Y and Z are X, H, alkyl of 1-8 carbon atoms, cycloalkyl of 5-12 carbon atoms, or carbocyclic aryl of up to 10 carbon atoms.

In other composition aspects, this invention relates to fillers for vulcanizable elastomer compositions comprising a mineral filler and, as adhesion promoter, a polybutadiene oil as defined herein, and to vulcanizable elastomer compositions comprising them.

In a process aspect, this invention relates to a method for preparing a polymeric adhesion promoter comprising reacting a silane hydride of the formula

wherein X, Y and Z are as above, with a polybutadiene of 400-6,000 molecular weight and 10-60% vinyl, 1-15% transvinylene and 25-85% cis-vinylene double bonds.

In another process aspect, this invention relates to processes for vulcanizing vulcanizable elastomers which comprise employing as adhesion promoter a polybutadiene oil of this invention.

DETAILED DESCRIPTION

In the polybutadiene oils of this invention, X is a hydrolyzable function, preferably halogen or alkoxy, e.g., chlorine, bromine, iodine and alkoxy of up to 8 carbon atoms, of which methoxy, ethoxy, propoxy and butoxy are preferred.

Y and Z can be the same as X or can be, independently, H, alkyl of 1-8 carbon atoms, cycloalkyl of 5-12 carbon atoms, e.g., of 3-7 ring members, preferably 5 or 6, or aryl of up to 10 carbon atoms, e.g., phenyl or phenyl substituted by one or more groups, e.g., halogen, alkyl or alkoxy as defined above. Preferred Y and Z are halogen, alkoxy of up to 4 carbon atoms, methyl, ethyl and phenyl.

Reactive silyl groups are introduced into the polybutadiene oil by a conventional hydrosilylation method, i.e., thermal, photochemical, free radical, or metal-catalyzed processes. Surprisingly, the polybutadiene oils of this invention, contrary to the teachings of U.S. Pat. No. 3,759,869, are excellent adhesion promoters. The number average molecular weights of the polybutadiene oils particularly suitable for this purpose are 400-6,000, preferably 600-2,000.

Preferably, the polybutadiene oils have 10-60% of vinyl, 25-85% of cis-vinylene and 1-15% of transvinylene double bonds, most preferably 30-50% of vinyl, 35-70% of cis-vinylene and 3-12% of trans-vinylene.

The polybutadiene oils contain 3-20% by weight of reactive silyl polymer units as defined above, more preferably 4-17% by weight thereof. These correspond to 0.4-3% by weight and 0.6-2.5% by weight of bound silicon, respectively.

Most preferably, the polybutadiene oils are of 600-2,000 molecular weight; contain 10-60% of vinyl, 25-85% of cis-vinylene and 1-15% of trans-vinylene double bonds and have 4-17% by weight of reactive silyl groups.

The particularly low viscosity of the polybutadiene oils used facilitates the hydrosilylation reaction, which can be effected without a solvent that would otherwise be necessary, as well as the work up procedure and subsequent handling of the resulting adhesion promoters. The operations employed during manufacture thereby become more economical and more acceptable ecologically since solvents are not consumed or discharged into waste waters or into the atmosphere.

Another advantage of the adhesion promoters of the invention is that lesser quantities of relatively expensive silane component are required for the production thereof.

The polybutadiene oils utilized can be produced, for example, by the process described in U.S. Pat. No. 3,983,183, whose disclosure is incorporated herein by reference.

Silanes suitable for addition to these polybutadiene oils are represented by the formula

wherein X, Y and Z are as above. Exemplary silanes are trichlorosilane, trimethoxysilane, triethoxysilane, tripropoxysilane, tribromosilane, methyldichlorosilane, methyldibromosilane, methyldiiodosilane, methyldimethoxysilane, methyldiethoxysilane, methylmethoxychlorosilane, ethyldipropoxysilane, phenyldibutoxysilane and methoxyethoxychlorosilane. Especially preferred is trichlorosilane. The conversion of the thus-introduced trichlorosilyl into other reactive silyl can take place during the work up procedure, for example by reaction of a trichlorosilyl substituent with alcohols, trialkyl orthoformates, epoxides, or sodium acetate by conventional techniques.

Such further conversions can be omitted if the liquid hydrosilane-addition product from HSiCl$_3$, in a special embodiment of the present invention, is applied directly to a mineral filler, which is thus impregnated therewith, and if hydrochloric acid liberated during this reaction is removed. The hydrochloric acid is obtained as dry hydrogen chloride gas, rather than as a solution in alcohol or alkyl chloride, and can therefore be further utilized.

In another advantageous embodiment of the present invention, the polymeric adhesion promoter is incorporated during the production of the mixture into the system containing elastomers and fillers.

Suitable mineral fillers are, for example, silicic acids and silicates, such as kaolin, talc, asbestos, mica, glass fibers, glass beads, synthetic Ca, Mg, and Al silicates, Portland cement and blast furnace slag; aluminum hydroxide and oxide hydrates and iron oxides and hydroxides. These fillers are generally used in the rubber industry. They differ by properties like particle size, particle size distribution, specific surface, surface reactivity in a wide range. For instance, the particle sizes may vary between about 5 m$\mu$ and 10$\mu$ whereas the length of fillers may extend even to some mm.

Elastomers usable in accordance with this invention are those vulcanizable by peroxides and/or sulfur, for example, natural rubbers; synthetic polyisoprene; polybutadiene; styrene-butadiene copolymers; polyalkenamers, e.g., polypentenamers, polyoctenamers, or polydodecenamers; ethylene-propylene copolymers (EPM); ethylene-propylene-diene copolymers (EPDM); isobutylene-isoprene copolymers (butyl rubber); and butadiene-acrylonitrile copolymers.

Other materials in the elastomer compositions compounded in accordance with the invention are conventional processing ingredients in rubber technology, as disclosed, for example, at The Vanderbilt, Rubber Handbook (ed. George Winspear), New York 1968.

The advantages of the adhesion promoters of this invention are shown by the following examples and comparative experiments.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

I. Production of Polymeric Tackifier

EXAMPLE 1

In a three-necked flask equipped with an internal thermometer, an agitator, a reflux condenser, and a dropping funnel, 750 g. of polybutadiene oil ($M_n$=680; cf. Table 1) is mixed under dry nitrogen with 1.0 ml. of a solution of 200 mg. of hexachloroplatinic acid (about 40% by weight Pt) in dry tetrahydrofuran (catalyst A). The mixture is stirred and heated to 110°–120° C. Thereafter, 75 ml. of trichlorosilane is added in 10 ml. portions. After reflux has ceased, the next portion is added. The entire amount of trichlorosilane is added within 15 minutes. Thereafter, the reaction mixture is kept at 110°–120° C. for 30 minutes more. After cooling the reaction is stopped with 100 ml. of methanol containing 300 mg. of 2,2'-methylene-bis(4-methyl-6-tert.-butylphenol) stabilizer. Then, 1.3 liters of methanol is added and the polymer phase is washed with vigorous agitation. After the phases are separated, the supernatant methanol layer, which has a high HCl content, is removed and the polymer phase is washed three more times in the same way. Thereafter, residual methanol is distilled off under vacuum under dry nitrogen. The yield is 770 g. (91% of theory) of a clear, yellowish oil (analytical data, see Table 1). The yield is not optimized and can be increased by more careful phase separation.

To test for incorporation of the analytically determined silicon into the polybutadiene oil, crosslinking ability is determined with water. For this purpose, 2.0 g. of yellowish oil is dissolved in 40 ml. of hexane. A 5% solution of dibutyltin dilaurate in hexane (1.0 ml.) is added thereto, and the solution is poured on water in a dish (surface 600 cm$^2$.). After allowing the product to stand for 24 hours at room temperature, a solid polymer film had been formed. After drying, the proportions of this polymer insoluble in toluene at room temperature are determined.

EXAMPLE 2

Polybutadiene oil (850 g.; $M_n$=1,100; see Table 1) is combined with 2.0 ml. of a red reaction solution from 200 mg. of hexachloroplatinic acid (about 40% by weight Pt) and 10 ml. of methyldichlorosilane in accordance with DOS No. 1,936,068 (catalyst B), and reacted as described in Example 1 with 85 ml. of trichlorosilane, whereafter the reaction mixture is worked up. Yield: 847 g. (89% of theory) of a clear, slightly yellowish oil (analytical data, see Table 1).

EXAMPLES 3–7

Examples 3–7 were carried out as for Examples 1 and 2. The amount and type of compounds employed and analytical data for the reaction products are set forth in Table 1.

COMPARATIVE EXAMPLE A

Polybutadiene oil (150 g.; $M_n$=9,000; 10% transvinylene, 73% vinyl, and 17% cis-vinylene) is diluted with 200 ml. of dry xylene and then reacted, after addition of 2.0 ml. of catalyst A, with 20 ml. of trichlorosilane as in Example 1 and thereafter worked up. The viscosity of the reaction mixture increases during this procedure to such an extent that separation of the methanol phase can be accomplished only incompletely. A mass of gel-like consistency, which can not be tested for practical application data, remains.

COMPARATIVE EXAMPLE B

Polybutadiene oil (150 g.; $M_n$=1,700; 27% transvinylene, 2% vinyl, 71% cis-vinylene) is treated, with addition of 1.0 ml. of catalyst B, with 15 ml. of trichlorosilane as in Example 2. In contrast to Example 2, reflux of trichlorosilane does not cease. After the work up, there remains a yellowish oil which contains only 0.1% by weight of Si and remains an oil instead of forming a solid polymer film in the crosslinking test.

TABLE 1

| Poly-butadiene Oil | $M_n$ | DB$^{(a)}$ tr/vi/cis | Amount (g.) | Amount of Trichloro-Silane (ml.) | Catalyst Type | Catalyst Amount (ml.) | Yield (% of Th.) | Si Content (%) | Gel Content Before Crosslinking (%) | Gel Content After$^{(b)}$ (%) |
|---|---|---|---|---|---|---|---|---|---|---|
| Ex. 1 | 680 | 7/60/33 | 750 | 75 | A | 1 | 91 | 2.0 | <2 | 55 |
| Ex. 2 | 1,100 | 8/40/52 | 850 | 85 | B | 2 | 89 | 2.5 | <2 | 80 |

TABLE 1-continued

| Poly-butadiene Oil | $M_n$ | DB[a] tr/vi/cis | Amount (g.) | Amount of Trichloro-Silane (ml.) | Catalyst Type | Catalyst Amount (ml.) | Yield (% of Th.) | Si Content (%) | Gel Content Before Crosslinking (%) | Gel Content After[b] Crosslinking (%) |
|---|---|---|---|---|---|---|---|---|---|---|
| Ex. 3 | 900 | 9/41/50 | 850 | 95 | B | 5 | 96 | 2.5 | <2 | 91 |
| Ex. 4 | 1,100 | 7/55/38 | 150 | 15 | B | 0.1 | 73 | 0.67 | <2 | 12 |
| Ex. 5 | 2,100 | 11/33/56 | 840 | 94 | B | 3 | 87 | 2.3 | <2 | 100 |
| Ex. 6 | 2,900 | 12/47/41 | 150 | 24 | B | 1 | 82 | 3.8 | <2 | 95 |
| Ex. 7[c] | 3,900 | 4/55/41 | 150 | 20 | A | 1 | 75 | 1.6 | <2 | 98 |

[a]Double Bonds (trans/vinyl/cis)
[b]See Example 1
[c]Diluted with 100 ml. of Xylene

II. Utilization of Polymeric Tackifiers

EXAMPLE 8

In an internal mixer, mixtures customary in the cable industry, based on unsaturated ethylene-propylene rubber (EPDM) with ethylidene norbornene as the ternary component, are prepared:

| Mixture Number | Parts by Weight | | | | | | |
|---|---|---|---|---|---|---|---|
| | 1 | 2 | 3 | 4 | 5 | 6 | 7 |
| EPDM, Random Type, $ML_{1+4}$ (100° C.) = 70 | 70.0 | 70.0 | 70.0 | 70.0 | 70.0 | 70.0 | 70.0 |
| EPDM, Sequential Type, $ML_{1+4}$ (100° C.) = 30 | 30.0 | 30.0 | 30.0 | 30.0 | 30.0 | 30.0 | 30.0 |
| Anhydrous Aluminum Silicate | 150.0 | 150.0 | 150.0 | 150.0 | 150.0 | 150.0 | 150.0 |
| Naphthenic Mineral Oil Plasticizer | 15.0 | 15.0 | 15.0 | 15.0 | 15.0 | 15.0 | 15.0 |
| Zinc Oxide | 5.0 | 5.0 | 5.0 | 5.0 | 5.0 | 5.0 | 5.0 |
| Paraffin | 3.0 | 3.0 | 3.0 | 3.0 | 3.0 | 3.0 | 3.0 |
| Low-Molecular Polyethylene | 5.0 | 5.0 | 5.0 | 5.0 | 5.0 | 5.0 | 5.0 |
| Product According to | | | | | | | |
| Example 1 | — | 2.0 | — | — | — | — | — |
| Example 3 | — | — | 2.0 | — | — | — | — |
| Example 4 | — | — | — | 2.0 | — | — | — |
| Example 5 | — | — | — | — | 2.0 | — | — |
| Example 6 | — | — | — | — | — | 2.0 | — |
| Comparative Example B | — | — | — | — | — | — | 2.0 |
| 2-Mercaptobenzimidazole | 1.5 | 1.5 | 1.5 | 1.5 | 1.5 | 1.5 | 1.5 |
| Polymer of 2,2,4-Trimethyl-1,2-dihydroquinoline | 1.0 | 1.0 | 1.0 | 1.0 | 1.0 | 1.0 | 1.0 |
| Stearic Acid | 1.0 | 1.0 | 1.0 | 1.0 | 1.0 | 1.0 | 1.0 |
| Benzothiazyl-2-cyclohexylsulfenamide | 1.0 | 1.0 | 1.0 | 1.0 | 1.0 | 1.0 | 1.0 |
| Diphenylguanidine | 1.0 | 1.0 | 1.0 | 1.0 | 1.0 | 1.0 | 1.0 |
| Tetramethylthiuram Disulfide | 1.5 | 1.5 | 1.5 | 1.5 | 1.5 | 1.5 | 1.5 |
| Sulfur | 1.5 | 1.5 | 1.5 | 1.5 | 1.5 | 1.5 | 1.5 |

Vulcanization curves of the mixtures are determined by a Zwick oscillatory elastometer at 150° C., with a deformation amplitude of 1° and 3 oscillations per minute. The following measured results are obtained:

TABLE 2

| Mixture No. | 1 | 2 | 3 | 4 | 5 | 6 | 7 |
|---|---|---|---|---|---|---|---|
| Time up to a Crosslinking Conversion of | | | | | | | |
| 10%, $t_{10}$ (min) | 5.2 | 4.8 | 4.5 | 4.8 | 4.4 | 4.4 | 5.1 |
| 90%, $t_{90}$ (min) | 56.1 | 30.4 | 22.6 | 25.4 | 20.0 | 22.1 | 42.3 |

The initial vulcanization time $t_{10}$ is affected only to a minor extent by the trimethoxysilyl-containing polybutadiene oils of the invention. In contrast thereto, final vulcanization time $t_{90}$ is reduced to less than one-half.

The test specimens 4 mm. in thickness, vulcanized in a press for 10 minutes at 180° C. are subjected to the following tests:

| Test | Standard |
|---|---|
| Tensile Strength (MPa) | DIN 53 504 |
| Elongation at Rupture (%) | DIN 53 504 |
| Tensile Value (MPa) | DIN 53 504 |
| Permanent Elongation (%) | Internal Method (Measured After 1 Minute) |
| Hardness (Shore A) | DIN 53 505 |

Test results are:

TABLE 3

| Vulcanizate No. | 1 | 2 | 3 | 4 | 5 | 6 | 7 |
|---|---|---|---|---|---|---|---|
| Tensile Strength | 5.2 | 8.0 | 7.5 | 7.8 | 7.7 | 8.6 | 5.6 |
| Elongation at Rupture | 530 | 416 | 376 | 500 | 384 | 446 | 565 |
| Tensile Value at 300% Elongation | 3.3 | 7.1 | 6.7 | 6.2 | 6.8 | 7.0 | 3.5 |
| Permanent Elongation | 37 | 13 | 13 | 23 | 17 | 16 | 38 |
| Hardness | 71 | 73 | 72 | 72 | 72 | 75 | 71 |

Polybutadiene oils which contain trimethoxysilyl groups effect in sulfur-vulcanized mixtures, a pronounced increase in crosslinking density, as shown by a great increase in tensile values and a reduction of permanent elongation. Products having a relatively low Si content (Example 4 with 0.67% Si) have a surprisingly high effect, especially with regard to tensile strength and tensile value (vulcanizate No. 4). At Si content above 3.0% (Example 6 with 3.8% Si), no further decisive improvement in vulcanizate properties (vulcanizate No. 6) is attained. In contrast thereto, no appreciable effect is attained by adding products corresponding to Comparative Example B (vulcanizate No. 7).

EXAMPLE 9

In an internal mixer, the following mixtures customary in the cable industry are prepared from unsaturated ethylene-propylene rubber (EPDM) with ethylidene norbornene as the ternary component:

| Mixture Number | Parts By Weight | | | | | | |
|---|---|---|---|---|---|---|---|
| | 8 | 9 | 10 | 11 | 12 | 13 | 14 |
| EPDM, Random Type, $ML_{1+4}$ (100° C.) = 70 | 70.0 | 70.0 | 70.0 | 70.0 | 70.0 | 70.0 | 70.0 |
| EPDM, Sequential Type, $ML_{1+4}$ (100° C.) = 30 | 30.0 | 30.0 | 30.0 | 30.0 | 30.0 | 30.0 | 30.0 |
| Anhydrous Aluminum Silicate | 150.0 | 150.0 | 150.0 | 150.0 | 150.0 | 150.0 | 150.0 |
| Naphthenic Mineral Oil Plasticizer | 15.0 | 15.0 | 15.0 | 15.0 | 15.0 | 15.0 | 15.0 |
| Zinc Oxide | 5.0 | 5.0 | 5.0 | 5.0 | 5.0 | 5.0 | 5.0 |
| Paraffin | 3.0 | 3.0 | 3.0 | 3.0 | 3.0 | 3.0 | 3.0 |
| Product According to | | | | | | | |
| Example 1 | — | 2.0 | — | — | — | — | — |
| Example 3 | — | — | 2.0 | — | — | — | — |
| Example 4 | — | — | — | 2.0 | — | — | — |
| Example 5 | — | — | — | — | 2.0 | — | — |
| Example 6 | — | — | — | — | — | 2.0 | — |
| Comparative Example B | — | — | — | — | — | — | 2.0 |
| Polymer of 2,2,4-Trimethyl-1,2-dihydroquinoline | 1.0 | 1.0 | 1.0 | 1.0 | 1.0 | 1.0 | 1.0 |
| 1,3-Bis(tert-butylperoxyisopropyl)benzene (40% Strength) | 7.0 | 7.0 | 7.0 | 7.0 | 7.0 | 7.0 | 7.0 |

The vulcanization curves of these mixtures are determined by a Zwick oscillatory elastometer at 180° C., with a deformation amplitude of 1° and at 3 oscillations per minute. The following results are obtained:

TABLE 4

| Mixture No. | 8 | 9 | 10 | 11 | 12 | 13 | 14 |
|---|---|---|---|---|---|---|---|
| Time up to a Crosslinking Conversion of | | | | | | | |
| 10%, $t_{10}$(min) | 2.5 | 2.5 | 2.5 | 2.4 | 2.3 | 2.4 | 2.4 |
| 90%, $t_{90}$(min) | 8.0 | 8.1 | 8.0 | 7.6 | 6.6 | 7.6 | 7.9 |

The initial and final vulcanization steps are influenced to a minor degree, if at all, by the products of this invention.

The 2 mm. test specimens vulcanized in a press for 10 minutes at 180° C. are tested as described in Example 8. Table 5 gives comparative test results:

TABLE 5

| Vulcanizate No. | 8 | 9 | 10 | 11 | 12 | 13 | 14 |
|---|---|---|---|---|---|---|---|
| Tensile Strength | 6.1 | 11.3 | 10.6 | 9.6 | 10.6 | 13.4 | 5.8 |
| Elongation at Rupture | 490 | 206 | 203 | 255 | 190 | 180 | 430 |
| Tensile Value at 100% Elongation | 3.5 | 6.6 | 6.2 | 5.3 | 7.6 | 7.8 | 3.7 |
| Hardness | 67 | 72 | 71 | 70 | 72 | 73 | 68 |

The tackifiers of this invention also effect a strong increase in the crosslinking density of peroxide-vulcanized mixtures and the characteristics of the vulcanizates are decisively improved. In contrast thereto, no appreciable effect is obtained with the product of Comparative Example B (vulcanizate No. 14).

Examples 8 and 9 show clearly that the tackifiers of this invention are effective in elastomer-filler systems crosslinked by a peroxide as well as by sulfur.

EXAMPLE 10

The following mixtures are produced in an internal mixer:

| Mixture No. | 15 | 16 | 17 | 18 |
|---|---|---|---|---|
| Non-Discoloring Butadiene-Styrene Elastomer (SBR 1502) | 100.0 | 100.0 | 100.0 | 100.0 |
| Coumarone Resin | 5.0 | 5.0 | 5.0 | 5.0 |
| Naphthenic Mineral Oil Plasticizer | 10.0 | 10.0 | 10.0 | 10.0 |
| Aluminum Silicate Hydrate with Silicic Acid | 100.0 | 100.0 | 100.0 | 100.0 |
| Product According to Example 3 | — | 0.25 | 1.0 | 2.0 |
| Stearic Acid | 2.5 | 2.5 | 2.5 | 2.5 |
| Zinc Oxide | 3.0 | 3.0 | 3.0 | 3.0 |
| Benzothiazyl-2-cyclohexylsulfenamide | 1.2 | 1.2 | 1.2 | 1.2 |
| Diphenylquanidine | 0.6 | 0.6 | 0.6 | 0.6 |
| Sulfur | 2.0 | 2.0 | 2.0 | 2.0 |

The 4 mm. test specimens vulcanized in a press under the conditions set forth below are tested as in Example 8. Table 6 gives test results:

TABLE 6

| Vulcanizate No. | | 15 | 16 | 17 | 18 |
|---|---|---|---|---|---|
| Vulcanization at 150° C. | Minutes | | | | |
| Tensile Strength | 20 | 7.9 | 8.0 | 9.4 | 10.4 |
| | 40 | 7.9 | 7.7 | 9.5 | 9.8 |
| | 60 | 7.3 | 8.2 | 9.2 | 9.9 |
| Elongation at Rupture | 20 | 696 | 632 | 554 | 504 |
| | 40 | 668 | 602 | 546 | 476 |
| | 60 | 670 | 642 | 550 | 480 |
| Tensile Value at 300% Elongation | 20 | 2.9 | 4.5 | 6.1 | 6.9 |
| | 40 | 2.8 | 4.4 | 6.2 | 7.2 |
| | 60 | 2.7 | 4.4 | 6.1 | 7.1 |
| Permanent Elongation | 20 | 33 | 25 | 19 | 14 |
| | 40 | 31 | 22 | 17 | 12 |
| | 60 | 30 | 22 | 16 | 11 |
| Hardness | 20 | 59 | 61 | 62 | 61 |
| | 40 | 60 | 61 | 6_ | 62 |

TABLE 6-continued

| Vulcanizate No. | 15 | 16 | 17 | 18 |
|---|---|---|---|---|
| | 60 | 60 | 61 | 61 | 61 |

As increasing amounts of the tackifier of this invention are used, the crosslinking density is markedly raised corresponding to the dosage, as compared to comparative experiments without the product of the invention. The mechanical properties of the vulcanizates are greatly improved.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions.

What is claimed is:

1. A polybutadiene oil of molecular weight 400–6,000, having double bonds which are 10 to 60% vinyl, 1 to 15% trans-vinylene and 25 to 85% cis-vinylene, and 3–20% by weight, corresponding to 0.4–3% by weight of bound silicon, of which is reactive silyl polymer units of the formula

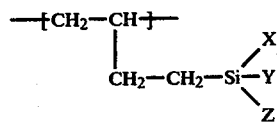

wherein X is halogen or alkoxy of up to 8 carbon atoms and Y and Z are X, H, alkyl of 1–8 carbon atoms, cycloalkyl of 5–12 carbon atoms, or carbocyclic aryl of up to 10 carbon atoms.

2. A polybutadiene oil of claim 1, of molecular weight of from 600 and 2,000.

3. A polybutadiene oil of claim 1, containing 4–17% of by weight of the reactive silyl groups, corresponding to 0.6–2.5% by weight of bound silicon.

4. A mineral filler impregnated with a polybutadiene oil of claim 1.

5. A vulcanizable composition comprising a vulcanizable elastomer, mineral filler and, as an adhesion promoter, a polybutadiene oil of claim 1.

6. A method of compounding a vulcanizable elastomer with a mineral filler and an adhesion promoter which comprises employing as adhesion promoter a polybutadiene oil of claim 1.

7. A method of claim 6, which comprises impregnating the filler with the polybutadiene oil prior to compounding with the elastomer.

8. The polybutadiene oil of claim 1, wherein X is alkoxy of up to 8 carbon atoms.

* * * * *